United States Patent
Rusk et al.

[11] Patent Number: 5,304,745
[45] Date of Patent: Apr. 19, 1994

[54] MODULAR CHECKWEIGHER AND GRADING SYSTEM

[75] Inventors: Frank J. Rusk; Alec T. Douglas, both of St. Johnsbury; Walter W. Sevigny, Danville; Harry J. Keen, St. Johnsbury, all of Vt.

[73] Assignee: Fairbanks Inc., Kansas City, Mo.

[21] Appl. No.: 985,634

[22] Filed: Dec. 3, 1992

[51] Int. Cl.⁵ ............ G01G 19/52; G01G 23/00; B07C 5/16
[52] U.S. Cl. .................... 177/50; 177/128; 177/145; 209/596
[58] Field of Search .......... 177/128, 145, 50, 245; 209/592-596

[56] References Cited

U.S. PATENT DOCUMENTS

| | | |
|---|---|---|
| Re. 29,944 | 3/1979 | Hyer et al. |
| 3,108,648 | 10/1963 | Williams |
| 3,180,475 | 4/1965 | Del Rosso |
| 3,276,525 | 10/1966 | Cass |
| 3,446,298 | 5/1969 | Cory et al. |
| 3,446,299 | 5/1969 | Leonowicz |
| 3,484,813 | 12/1969 | Davies |
| 3,545,611 | 12/1970 | Husome |
| 3,596,750 | 8/1971 | Hendon et al. ........... 177/145 |
| 3,714,401 | 1/1973 | Yano |
| 3,724,720 | 4/1973 | Bullivant |
| 3,770,069 | 11/1973 | Loshbough |
| 4,023,668 | 5/1977 | De Santo |
| 4,100,984 | 7/1978 | Klopfenstein et al. |
| 4,102,421 | 7/1978 | Ozaki et al. |
| 4,136,749 | 1/1979 | Di Rosa |
| 4,137,567 | 1/1979 | Grube |
| 4,137,568 | 1/1979 | Dlugos |
| 4,214,640 | 7/1980 | Di Rosa |
| 4,231,439 | 11/1980 | Hall et al. .......... 177/50 X |
| 4,241,407 | 12/1980 | Sookikian et al. |
| 4,363,408 | 12/1982 | O'Brien et al. |
| 4,440,249 | 4/1984 | Del Rosso ........... 177/145 |
| 4,488,635 | 12/1984 | Linville |
| 4,768,600 | 9/1988 | Colvin et al. |
| 4,838,705 | 6/1989 | Byers et al. |
| 4,848,479 | 7/1989 | Schaltegger |
| 4,951,763 | 8/1990 | Zimmerman et al. |
| 5,170,857 | 12/1992 | Phillips et al. ........... 177/145 |

FOREIGN PATENT DOCUMENTS

2320391 11/1974 Fed. Rep. of Germany.

*Primary Examiner*—George H. Miller, Jr.
*Attorney, Agent, or Firm*—Bryan Cave

[57] ABSTRACT

A modular checkweigher/grader system is disclosed. A feed conveyor is provided for directing items to be weighed to a weighing conveyor. The entire system is modularly designed using lightweight durable materials, such as plastics and stainless steel. Each conveyor includes a conveyor belt in contact with upper and lower surfaces of a platform. The belts are tightened and loosened with quick release tension clamps and driven by air powered motors. The feed conveyor is attached to a frame by toggle clamps. The weighing conveyor is attached to a load cell which is connected to the frame by toggle clamps. These toggle clamps permit the entire feed and weighing conveyors to be easily removed. All of the air and electrical connector to the conveyors are by quick release connectors. The entire weighing conveyor is used as the weighing platform. A tachometer may be used to regulate the conveyor speed. A modular grading conveyor is disclosed for categorizing objects from the weighing conveyor. A tensioner is provided for allowing the grader belt to be slackened for easy cleaning. Grader paddle control modules are hinged for easy cleaning. The hinges are secured by butterfly nuts for easy removal of broken modules. All air and electrical connections to the paddle control modules are by quick release connectors.

7 Claims, 8 Drawing Sheets

MODULAR CHECKWEIGHER AND GRADING SYSTEM

BACKGROUND OF THE INVENTION

I. Field of the Invention

The present invention relates generally to checkweigher and grading systems, and more particularly to a modular checkweigher and grading system wherein the weighing platform includes the conveyor assembly, including air powered motors for driving the conveyor belts.

II. Description of the Prior Art

Checkweigher/grader systems are commonly known in the art. These systems are generally used to check the weight of objects moving across a high-speed conveyor, and to determine if the weight of the object is within a desired range.

In the majority of prior-art checkweigh systems, a weighing platform connected to a load cell is centrally located under a slackened belt or chain which carries the item to be weighed. The belt or chain is sufficiently slack to allow the item to momentarily come to rest on the weighing platform. Such a system is shown for example in Del Resso, U.S. Pat. No. 3,180,475. These systems often produce errors in the weight reading caused by the slackening of the belt. In order to overcome the problem of belt slackening, prior patents have either attempted to electronically filter the oscillation errors, or employed mechanical assemblies to reduce the error.

De Santo, U.S. Pat. No. 4,023,668 discloses a conveyor in which the entire conveyor belt, and drive means are located on top of the load cell. This system reduces the error due to slackening, but because a portion of the belt remains supported only by end pulleys, slackening errors still result.

Other examples of systems to reduce checkweigher error include, for example, Hall, Jr. et al, U.S. Pat. No. 4,231,439, and Yano, U.S. Pat. No. 3,714,401.

An additional problem with prior art checkweigh systems is that they were not suitable for harsh environments, such as processing chickens. These mechanical systems are difficult to repair and clean, and often breakdown in the harsh environment. In the event of a breakdown, the entire line must be stooped until a repair is effectuated. Further, the mechanical apparatus used in these systems, especially the electrical motors and chain drives, require extensive, and expensive maintenance procedures.

Grading systems are also commonly known. Most of these systems likewise require much maintenance to operate in harsh environments. For example, most conveyors are extremely difficult to clean or dry in the event of a spillage. The conveyor belts may difficult to lift, and the control boxes may not be moved for cleaning. If a breakdown occurs, the entire line may remain idle until repaired.

None of the prior art systems provide a checkweigher/grader system in which the conveyors may be easily removed, replaced or cleaned; in which the conveyor belt remains in contact with both the upper and lower surfaces of the weighing platform for reduced slackening errors; in which the weight of the drive mechanism is included as part of the weight applied to the load cell, including low maintenance motors; and in which modular, reconfigurable, easily cleanable grader units are used.

SUMMARY OF THE INVENTION

The present invention is a modular checkweigher/grader system having simplified maintenance characteristics, and improved expendability and reconfigurability. A feed conveyor is provided for directing items to be weighed to a weighing conveyor. Each conveyor is modularly designed using lightweight durable materials, such as plastics and stainless steel. Each conveyor includes a pair of end rollers mounted on a stiff platform and circumscribed by a conveyor belt. The stiff platform is preferably constructed of thermal plastic which provides light weight, low friction, no corrosion, and is waterproof.

Each roller is outwardly movable in extension slots on the ends of the stiff platform, and one roller is preferably connected to a quick release tension clamp which applies outward pressure against the roller, thereby tensioning the belt. When the clamp is released, the belt may be easily lifted for cleaning thereunder. In the tensioned position, the belt is preferably in contact with the top and bottom surfaces of the stiff platform to reduce errors due belt slinging. The quick release tension clamps include adjustment screw means for restoring tension to the belt in the event the belt loosens. The belt is preferably of one-piece construction having high tear strength and low resistance.

One end of one roller on each conveyor preferably includes a gear pulley for driving the roller and conveyor belt via a drive belt powered by an air motor. Each air powered motor is preferably secured to the stiff platform by quick release bolts for easier replacement. The pulley and belt design of the present invention provide for smooth transmission and low noise, even during high speeds. The air motor provides long life, light weight, low maintenance, increased horsepower to weight ratio, and no performance degradation due to brown outs. Since the motor is powered by air, the need for bulky AC/DC power supplies and motor controls is eliminated, along with the need to replace motor brushes. The air powered motors are moisture proof, eliminating spill related motor damage.

The feed conveyor is preferably mounted to a frame by easily releasable toggle clamps. These toggle clamps permit the entire feed conveyor to be easily removed for cleaning or replacement. All of the air and electrical connector to the conveyors are by quick release connectors. To remove the feed conveyor, it is necessary only to release the connectors and the toggle clamps. The lightweight conveyor lifts easily from the system.

The weighing conveyor is substantially similar to the feed conveyor, except the entire weighing conveyor is mounted atop a load cell. This design reduces errors caused in conventional conveyor weighing systems. The conveyor is attached to the load cell by easily releasable fastening means, such as butterfly nuts. The load cell is firmly mounted to the frame via toggle clamps as described above. As can be seen from he foregoing, the entire weighing conveyor is used as the weighing platform. The entire weighing conveyor and load cell is easily removable for maintenance and cleaning. In the event of a breakdown, the entire weighing assembly may be removed and replaced. with cleaning and repair being done off-line. The modular construction of the present invention reduces down-time of checkweigher scales.

If desired, an optical tachometer may be employed to feed back the speed of the air powered motor on the weighing conveyor to a computer to eliminate timing variations due to poor air supply regulation. Also, the speed of the belt may be utilized to assure that the object remains on the weighing platform long enough for the weight reading from the load cell to settle.

The system of the present invention further includes a grader system. Once objects have been weighed, a grading conveyor is provided for receiving objects from the weighing conveyor and for transporting them past grading paddles which categorize the items by weight by pushing them into hoppers. A sensor is provided toward the front of the grading conveyor for generating a signal when an item is on the conveyor. Utilizing the speed of the conveyor, as derived by a tachometer on the grading conveyor, a conventional computer determines the position of an object on the conveyor after it has crossed the sensor and generates a signal to actuate the appropriate grading paddle when the item is at the correct position on the conveyor.

In an alternative embodiment, a sensor is provided for each paddle. In this embodiment, instead of the computer determining when to actuate the paddles, the computer would only determine which paddle need be activated for the item, and would signal that paddle in advance. When its sensor were crossed, the paddle would actuate.

The grading conveyor of the present invention is designed to be modular and easily maintainable. A tensioner is provided for allowing belt to be slackened for easy cleaning. Each grader paddle is controlled by a separate paddle control module. Each paddle control module is mounted on the grader frame by hinges so that it may be hinged away for cleaning. The hinges are preferably secured by easily removable fastener means so that the modules may be quickly removed for replacement. Furthermore, all air and electrical connections to the paddle control modules are by quick release connectors. Each paddle control modules is secured from rotating by a butterfly nut. A module may be swung away for the grader frame for cleaning by removing the nut.

Each paddle directs objects of the various grades into hoppers. Each paddle control module may include controller mechanisms for controlling a door on the hopper for either storing items in the hopper, or for opening the door and releasing the items.

In an alternative embodiment, the grader system may include conveyors as previously described with respect to the feed and weighing conveyors. In this embodiment, a modular conveyor would be provided for each grading category, arranged so that each conveyor feeds the succeeding one. Each conveyor is provided with a paddle, controller circuitry, and a sensor. A computer program allows system reconfiguration for addition or removal of graders according to system requirements. If it were desired to add additional grader modules, these could be daisy chained at the end of the existing graders. The computer need only be reconfigured to generate a signal for the new category.

As can be seen from the foregoing, the system of the present invention provides a modular, more easily maintainable checkweigher/grader system. If a conveyor is in need of repair or replacement, it may be replaced in minutes for off-line adjustment or service. The paddle control units may also be replaced with very little down-time. The system provides for simplified reconfiguration and expansion of the grading system. Further, since the weighing platform includes the conveyor assembly, errors due to mechanical variables are reduced.

DESCRIPTION OF THE PREFERRED EMBODIMENT

Figure 1:
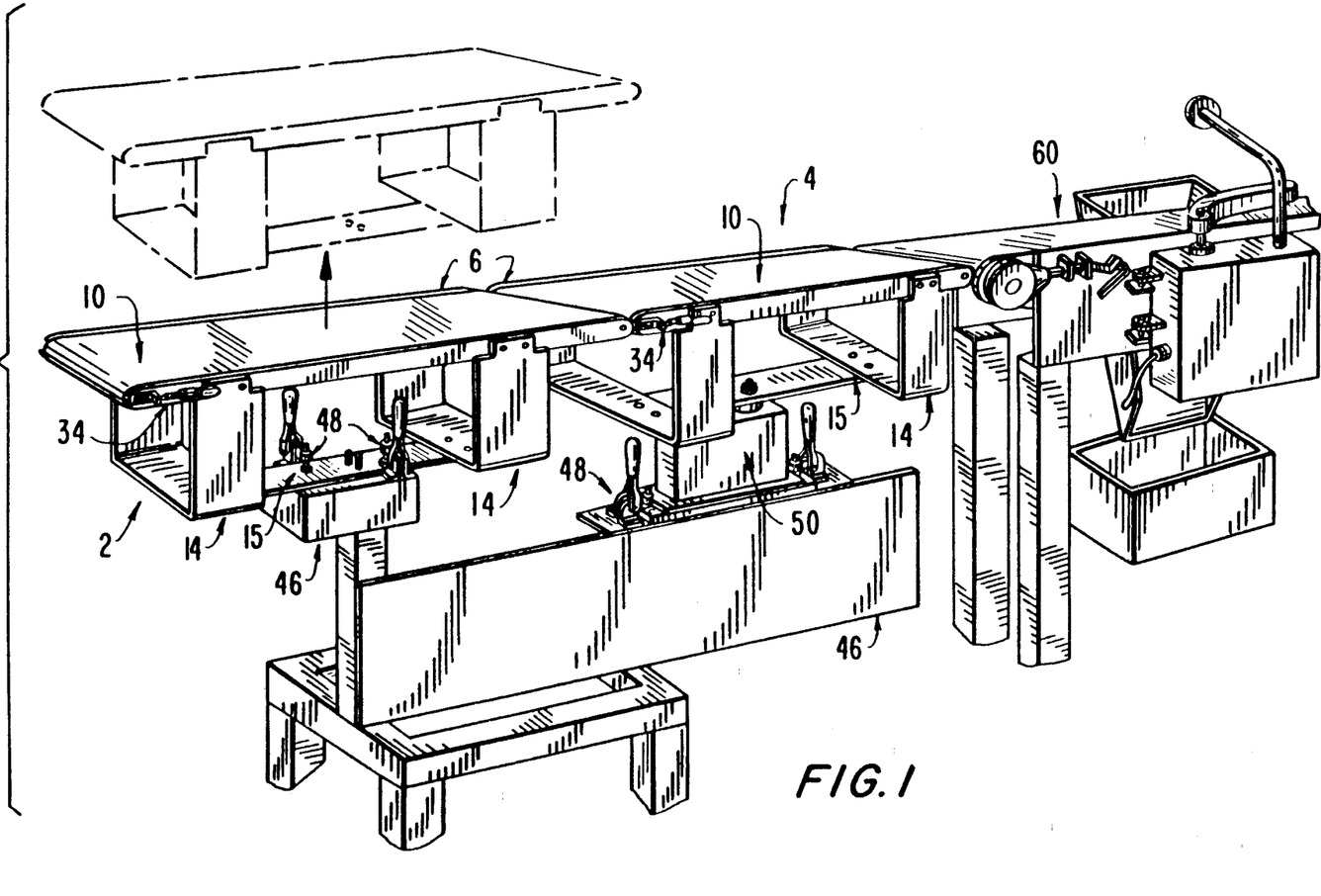
FIG. 1 is a perspective view of the checkweigher of the present invention.

As shown in FIG. 1, the present invention is a modular checkweigher and grading system designed for reduced cost and simplified maintenance. Feed conveyor 2 is provided for directing items to be weighed to a weighing conveyor 4. Each conveyor is modularly designed using lightweight durable materials to be replaced or cleaned in a timely fashion.

Conveyors 2 and 4 include conveyor platforms 6 upon which the item to be weighed is moved. As shown in FIGS. 1 and 6-9, each conveyor platform 6 comprises a pair of end rollers 8 and 9 movably mounted to a stiff platform 12. The roller-platform combination is mounted within a movable belt 10 upon which the item to be weighed travels. Stiff platform 12 is firmly supported in place by support brackets 14 which are preferably connected via support beams 15. Support beams 15 preferably include centrally located mounting holes for supporting the conveyors as described below.

Stiff platform 12 is preferably constructed of thermal plastic which provides light weight, low friction, no corrosion, and is waterproof. However, it is readily foreseen that other stiff materials may be utilized.

Stiff platform 12 preferably includes extensions 20 having slots 21 cut therein. Rollers 8 and 9 preferably include outwardly extending end shafts 22 which fit into slots 21 and allow rollers 8 and 9 to move within slots 20. Shafts 22 preferably extend through extensions 20, being firmly secured in holes 26 at an end of L-brackets 24 via conventional securing means. Holes 26 closely corresponds to the diameter of end shafts 22, so that rollers 8 and 9 may rotate with minimal friction. L-brackets 24 include slots 30 through which bolts 32 slidably attach L-brackets 24 to stiff platform 12.

Alternative embodiments exist which would allow rollers 8 to be rotatable while firmly secured. For example, each roller 8 and 9 may be pre-pressed into a bearing assembly, and mounted in brackets made out of, for example, stainless steel. In this embodiment, stiff platform 12 does not include extensions 20, but is preferably flat at each end. The brackets on the rollers are then attached to the stiff platform by any conventional attachment means. One roller may be movable in its bracket so as to provide an adjustment means for the conveyor belt, as previously indicated. In this embodiment, if a roller fails, it may be quickly replaced without the necessity for replacing the entire conveyor platform. Also, if the conveyor were to fall, there is a reduced likelihood of extensions 20 breaking off of the stiff platform as a result of impact.

The other ends of L-brackets 24 extend outwardly from stiff platform 12 and are under firm pressure from quick release tension clamps 34. In a tensioned position, quick release tension clamps 34 apply pressure against the outwardly extending end of L-brackets 24 forcing rollers 9 outward, and tensioning belt 10. In the tensioned position, belt 10 is preferably in contact with the top and bottom surfaces of stiff platform 12. This reduces error due to slinging of the belt. In the event belt 10 loosens, quick release tension clamps 34 include adjustment screw means for restoring tension to the belt. Additionally, clamps 34 include a release position which relieves the tension against belt 10 in a simplified fashion for cleaning and replacement.

Belt 10 is preferably of one-piece construction having high tear strength and low resistance. Such belts are commonly known, for example being USDA approved for food handling conveyor belts.

Rollers 8 are similar in construction to rollers 9. Rollers 8 are preferably non-movably but rotatably mounted in extensions 20. Rollers 8 may be held in place by conventional securing means, such as bolts, or may be held in the slots by tension provided by belt 10 in conjunction with the belt tensioning means. One end of each roller 8 preferably includes a gear pulley 36 firmly mounted on end shaft 22, rollers 8 rotating responsive to rotational movement of pulley 36.

Pulley 36 is preferably driven via drive belt means 38 by air powered motor 40. Air powered motor 40 is preferably firmly mounted in support bracket 14 by conventional securing means including means for adjusting the tension of drive belt 38. Air powered motor 40 may be secured to stiff platform 12, if desired. Air powered motor 40 is preferably secured by quick release bolts for easier replacement. It is readily foreseen that any conventional drive means, such as electric motor, may be employed in the modular weighing conveyor of the present invention.

If desired, one or both air powered motors 40 may include an optical tachometer with optical tachometer receiving member 44. The optical tachometer feeds back the speed of air powered motor 40 to eliminate timing variations due to poor air supply regulation. Also, the speed of the belt may be utilized to assure that the object remains on the weighing platform long enough for the weight reading from the load cell to settle as described below. While any conventional tachometer system may be used, an optical tachometer has been found to have the lightest weight and best maintenance characteristics.

As shown in FIG. 1, support beam 15 on feed conveyor 2 is mounted to base 46 via toggle clamps 48. Toggle clamps 48 permit the entire feed conveyor 2 to be easily removed for cleaning or reduced replacement time in the event of a breakdown. All of the air supply connections to air powered motors 40 and tachometer connections to the tachometers are by conventional quick release connections. To remove the feed conveyor 2, it is necessary only to release the air and electrical connections, and to release toggle clamps 48.

Weighing conveyor 4 is preferably attached at support beam 15 to load cell 50 via conventional easily releasable fastening means, such as butterfly nuts. Load cell 50 is firmly mounted to base 46 via toggle clamps 48. As can be seen from he foregoing, the entire weighing conveyor 4 is used as the weighing platform. The entire weighing conveyor 4 and load cell is easily removable for maintenance and cleaning. In the event of a breakdown, the entire weighing assembly may be removed and replaced, with cleaning and repair being done off-line. The modular construction of the present invention reduces down-time of the checkweigher scale of the present invention.

As with the feed conveyor 2, all electrical and air connections are made to weighing conveyor 4 and load cell 50 are via quick release connections.

Load cell 50 may be of any conventional type suitable for the particular weighing application.

Base 46, brackets 14, and beams 15 are preferably of a moistureproof, durable material, such as stainless steel. It is readily foreseen that these and other parts of the present invention may be constructed of any suitable materials.

Once objects have been weighed, it may be desired to grade them by weight. A grading conveyor 60 is provided for receiving objects from weighing conveyor 4 and for transporting them past grading paddles 62 which categorize the items by weight by pushing them into hoppers 74. Grading conveyor 60 preferably includes a conventional conveyor belt 64 upon which the items are moved. Toward the front of grading conveyor 60, a sensor is provided for generating a signal when an item is on the conveyor. Conveyor 60 preferably includes a conventional tachometer for determining the speed of the conveyor. Utilizing the speed, as derived by the tachometer, a conventional computer may determine the position of an object on the conveyor after it has crossed the sensor. With this information, the computer preferably generates a signal to actuate the appropriate grading paddle 62 when the item is at the correct position on the grading conveyor 60.

The sensor may be of any conventional type for detecting the passage of an object, such as infrared, photoelectric beam, spring loaded mechanical sensor, or others. The weight of the item having been determined on weighing platform 4, the computer determines into which grading category to place the item. The computer registers the passage of the item through the sensor and calculates the amount of time necessary for the item to get to the grader for the correct weight category. At the appropriate time, the computer generates the necessary electrical signal to grade the object properly.

If desired, a sensor may be provided for each paddle 62. In this embodiment, it would not be necessary to employ a tachometer, or to utilize computer-generated timing signals. Rather, the computer would signal in advance the paddle which should actuate responsive to an item crossing its sensor. Each sensor would actuate its own paddle when an object in that grade is present. Since each grader requires a sensor, this embodiment is more expensive, and requires increased maintenance.

Figure 2:
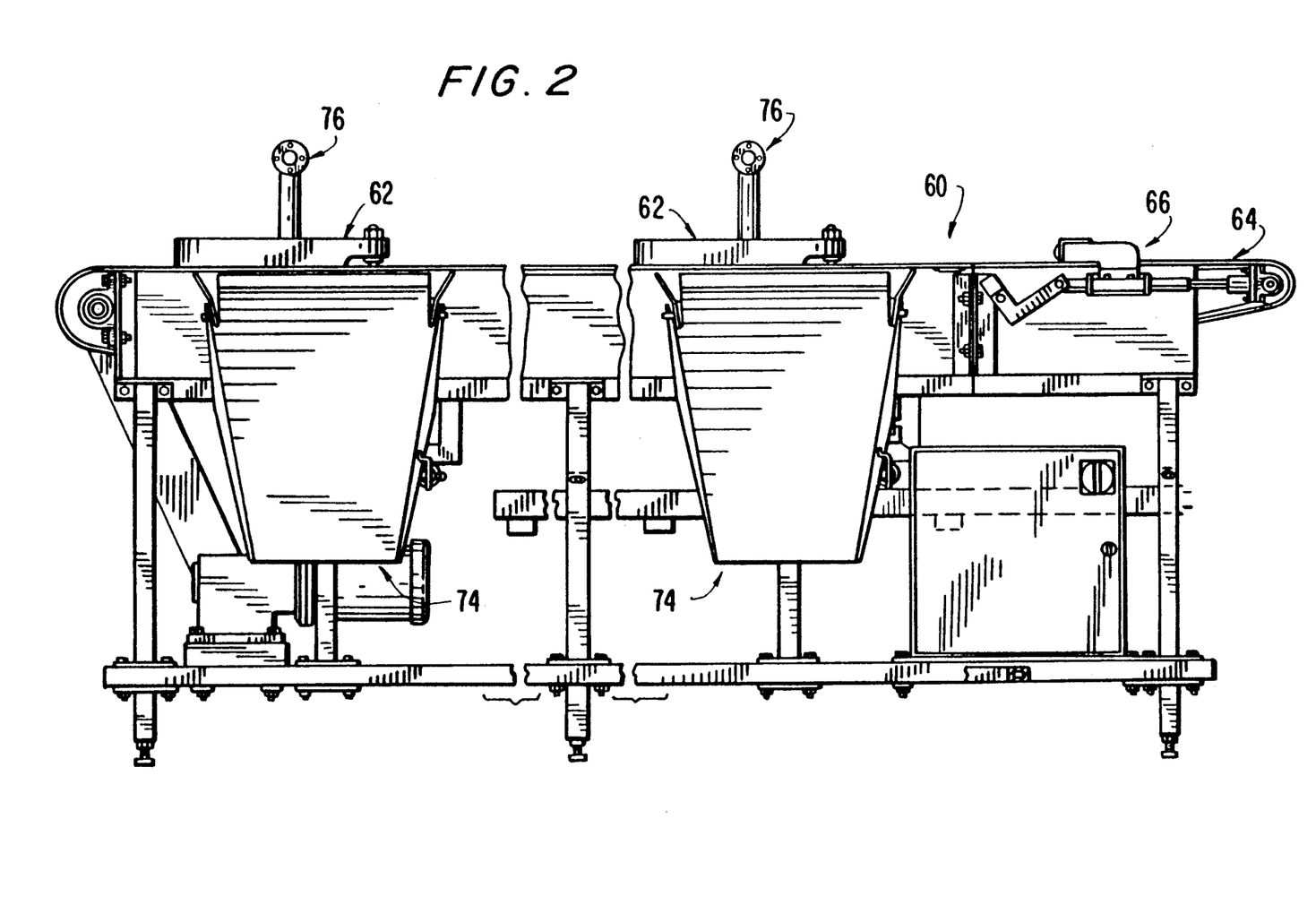
FIG. 2 is a perspective view of the grader of the present invention.
Figure 3:
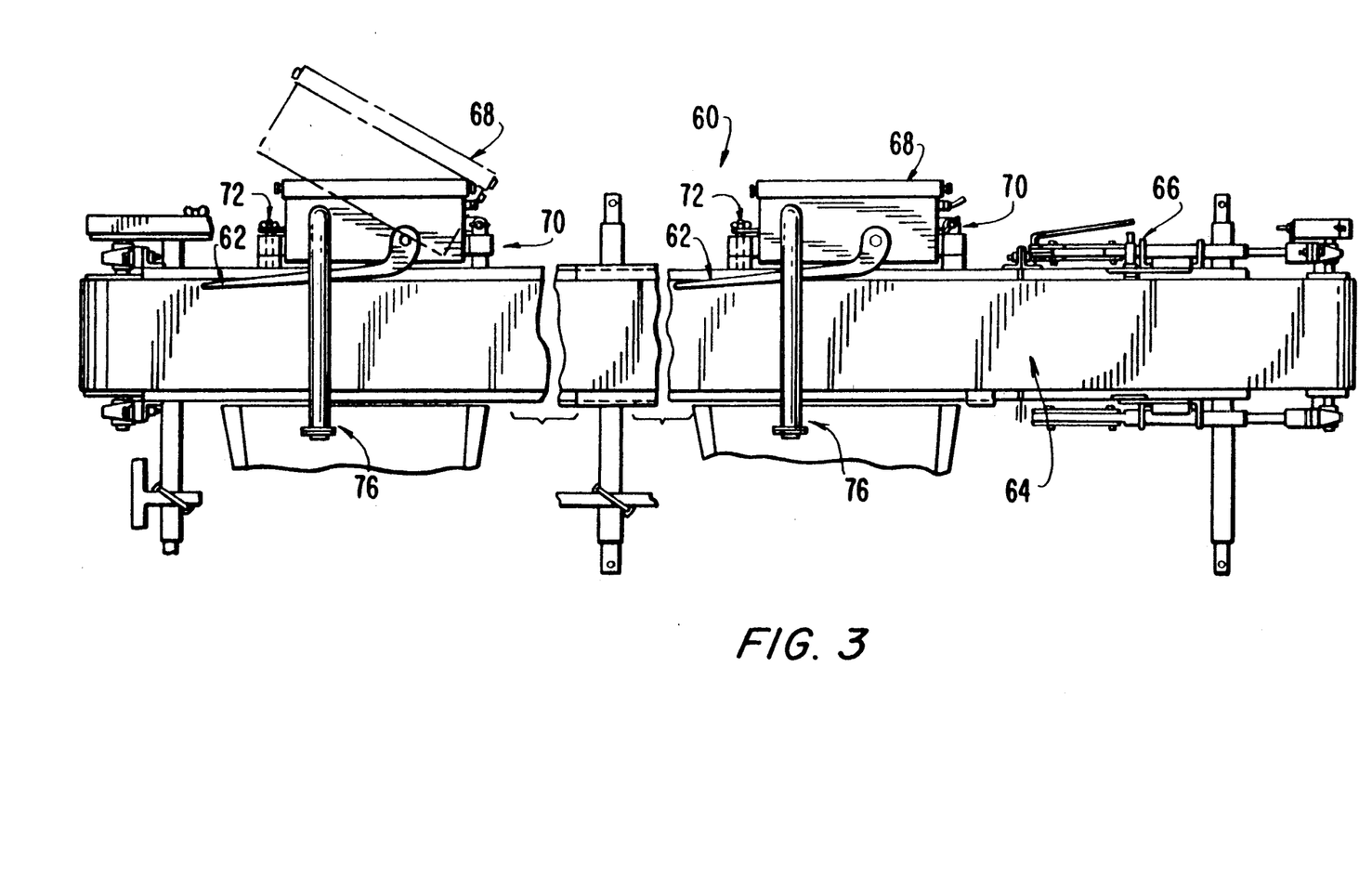
FIG. 3 is a top view of the grader of the present invention.
Figure 4:
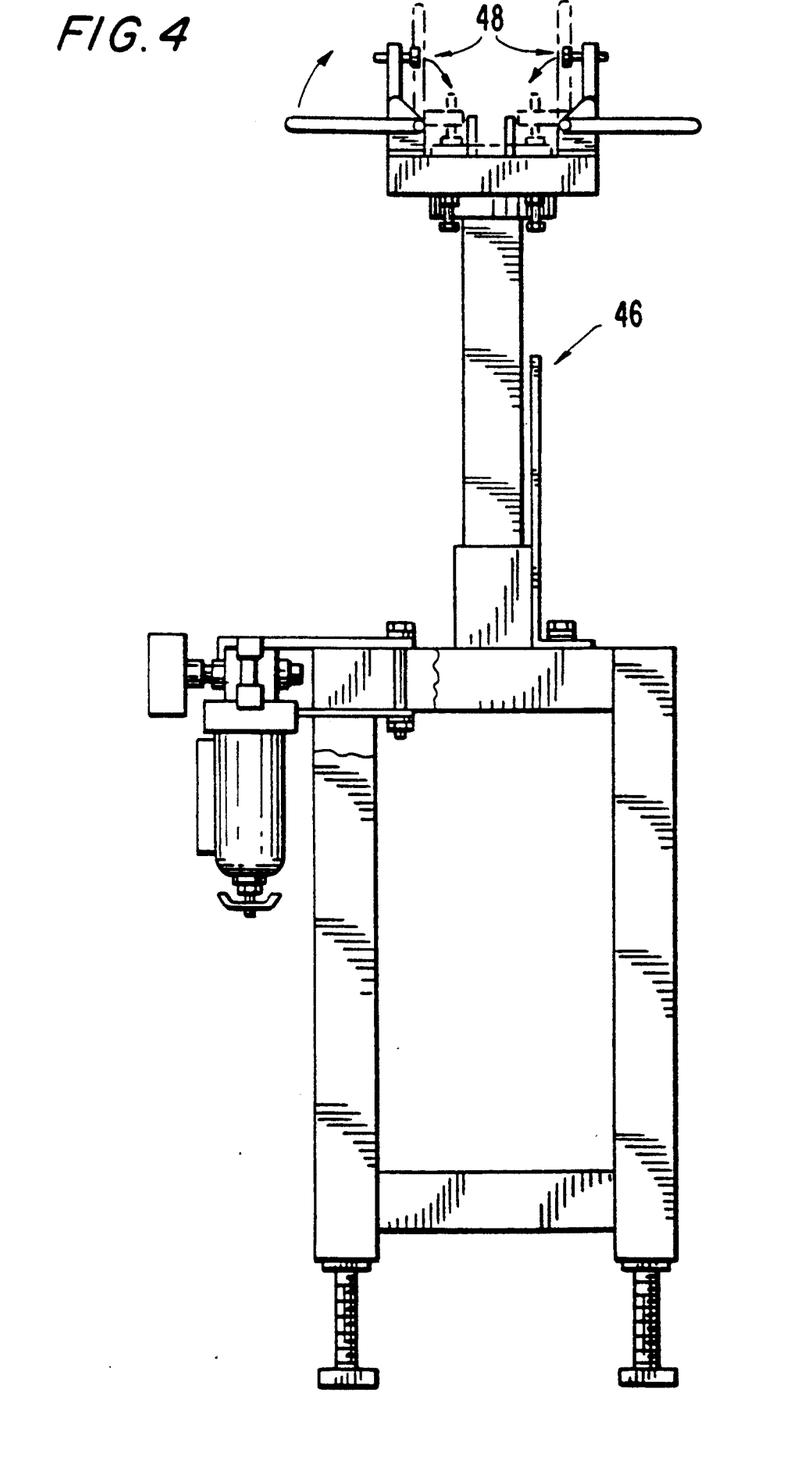
FIG. 4 is a schematic end view of the checkweigher of the present invention.
Figure 5:
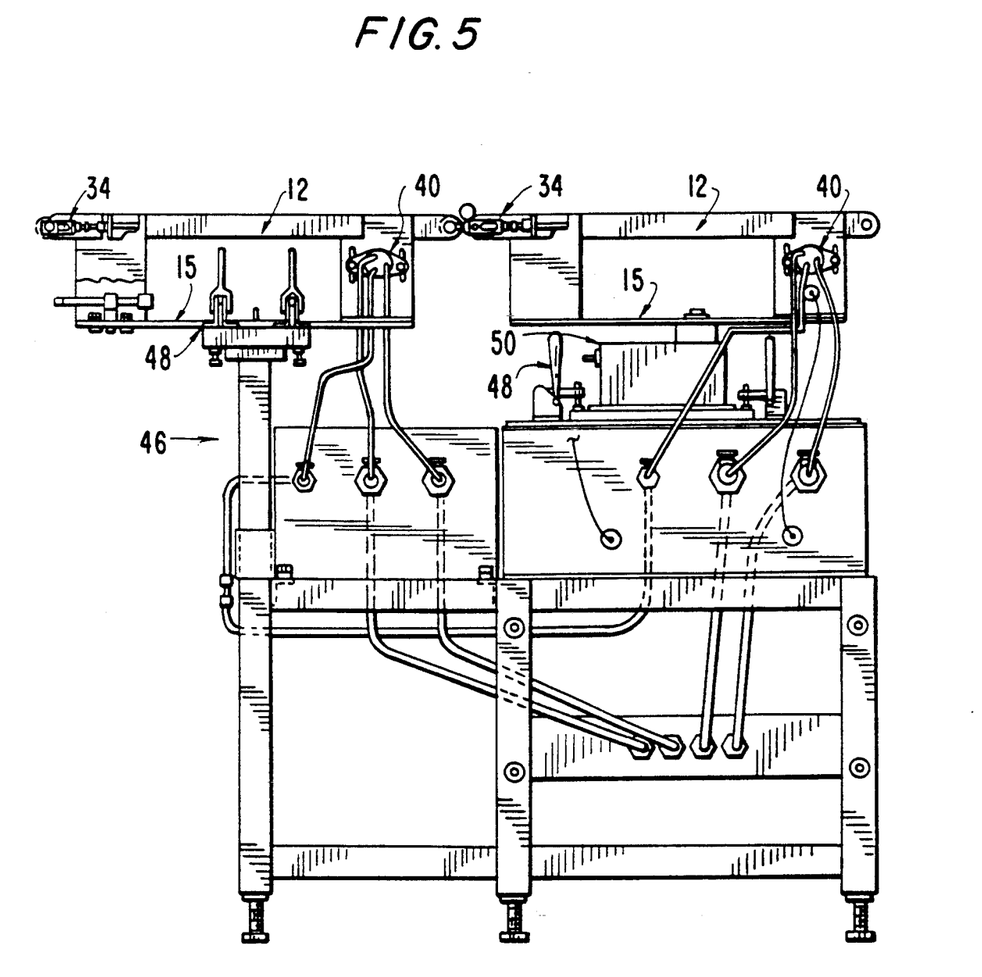
FIG. 5 shows a schematic side view of the checkweigher of the present invention.
Figure 6:
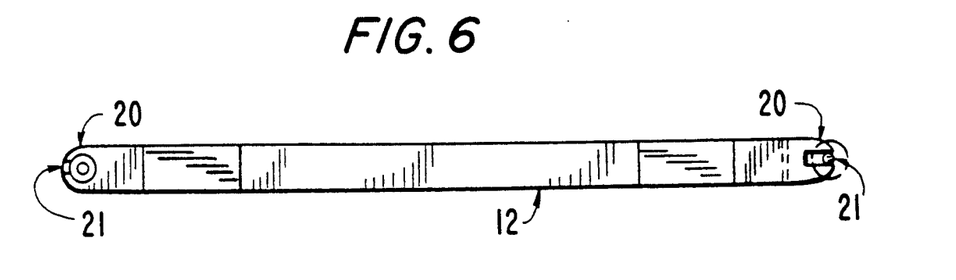
FIG. 6 shows a schematic side view of the weighing platform of the checkweigher of the present invention.
Figure 7:
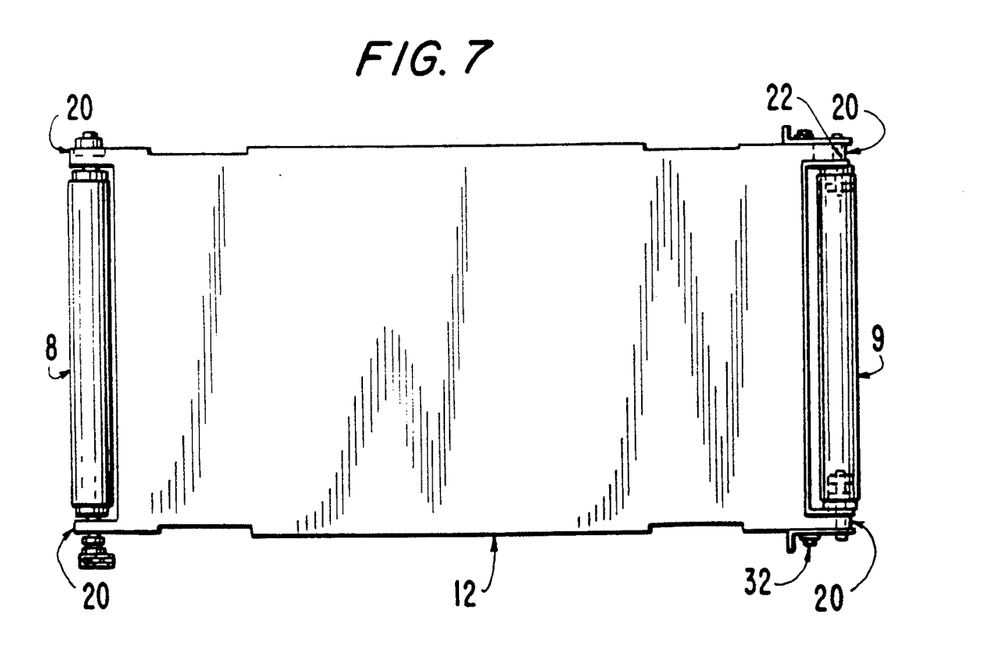
FIG. 7 shows a schematic top view of the weighing platform of the checkweigher of the present invention.
Figure 8:
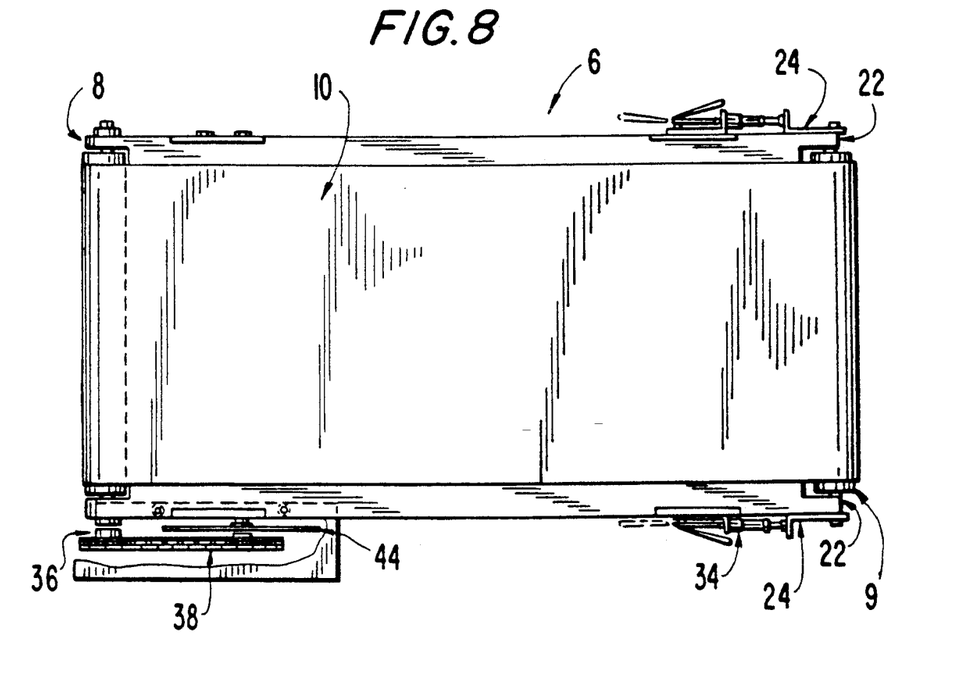
FIG. 8 shows a schematic top view of the weighing conveyor of the checkweigher of the present invention.
Figure 9:
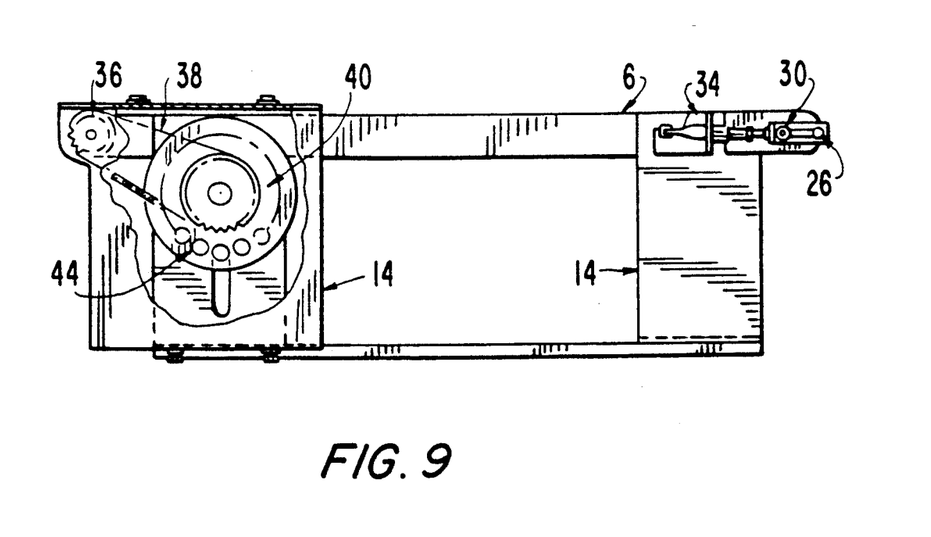
FIG. 9 shows a schematic side view of the weighing conveyor of the checkweigher of the present invention.
Figure 10:
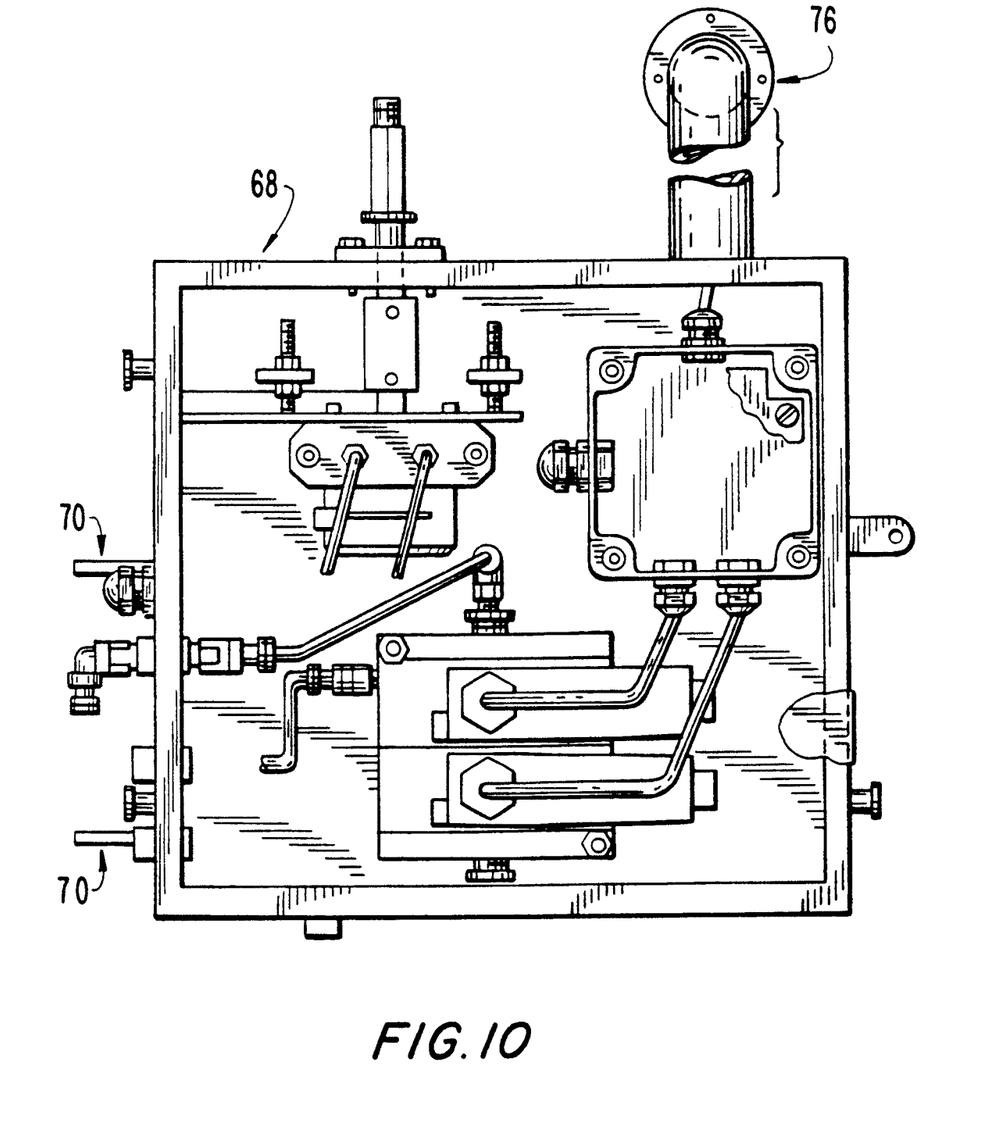
FIG. 10 shows a schematic side view of a grader module of the grader the present invention.

As shown in FIGS. 2-3 and 10, the grading conveyor of the present invention is designed to be modular and easily maintainable. Tensioner 66 is provided for allowing belt 64 to be quickly slackened for easy cleaning.

Each grader paddle 62 is controlled by a separate paddle control module 68. Paddle control modules 68 are rotatably mounted on the grader frame by hinges 70. Hinges 70 allow the paddle control module 68 to be hinged away for cleaning. Paddle control modules 68 are preferably attached to hinges 70 with butterfly nuts or other easily removable fastener means so that the modules 68 may be quickly removed for replacement. Furthermore, all air and electrical connections to paddle control modules 68 are by quick release connectors. In use, paddle control modules 68 are preferably secured from rotating by conventional fastener 72 which may be, for example, a butterfly nut. A module 68 may be easily swung away for the grader frame by removing the butterfly nut.

Each paddle control module includes a paddle 62, for directing objects of the selected grade into hoppers 74. Internally, each paddle control module 68 preferably contains a solenoid air valve assembly for receiving an electrical signal, preferably a control signal from the computer, and for electrically opening an air valve for actuating paddle 62. If desired, each hopper 74 may include an air activated release mechanism for controlling a door on the hopper for either storing items in the hopper, or for opening the door and releasing the items. In practice, a basket might be provided below the hopper for catching the graded items. The computer might be programmed with the capacity for the basket, and generate a signal when the basket is full. In this embodiment, each paddle control module 68 preferably includes a solenoid actuator for receiving this computer generated electrical signal for opening an air valve to close the hopper door. When the basket is full, the computer signals the module 68 to close the hopper door. The hopper accumulates the items until an operator actuates a control switch on control arm 76 indicating that the full basket has been replaced by an empty one. Responsive to the operator command, the control module 68 preferably opens the hopper door and accumulation continues in the basket.

In an alternative embodiment, an easily expandable grader system may include conveyors as previously described with respect to the feed and weighing conveyors, 2 and 4. In this embodiment, a conveyor of the previously described type would be provided for each grading category, arranged so that each conveyor feeds the succeeding one. Each conveyor is provided with a paddle and controller circuitry, such as paddle control modules 68, as well as a sensor. A computer program allows system reconfiguration for addition or removal of graders according to system requirements. For example, if it were desired to provide 5 categories of items, the system would consist of 7 substantially similar modular conveyors, a feed conveyor, a weighing conveyor, and five grading conveyors. A computer would weigh the item on the weighing conveyor, and determine its category. When the sensor on the grader associated with that category were triggered, the paddle for that conveyor would be actuated. If it were desired to add additional grader modules, these could be daisy chained at the end of the existing graders. A control wire to the computer system, or a link to a data bus would be the only connections to the computer needed. The computer need only be reconfigured to generate a signal for the newly added grader. As can be seen from the foregoing, the system of the present invention provides a readily expandable weighing system.

In a third embodiment, a motor drive module is provided at an end of the grader conveyor for moving the conveyor belt, and a conveyor belt adjuster module is provided at the beginning of the conveyor, similar to the configuration in FIG. 3. These are preferably individual modules. The motor on the motor module preferably includes a direct drive for moving a shaft, and thereby moving the conveyor belt. Between these end modules, the user may add a desired number of individual grader modules, each preferably having a control module, a hopper, a switch for opening the hopper. Thus, in order to add additional modules, the user need only replace the belt with a longer belt, and reconfigure the control software for the increased number of modules. Also, each module may include a 360 degree visible light which may be lighted to notify the controller when a grade has been filled and the hopper is closed.

For either the feed, weighing or grading conveyors, if a conveyor is in need of repair or replacement, it may be replaced in minutes. This allows off-line adjustment or service to minimize down time. If the paddle control circuitry or apparatus were to fail, the paddle control units may also be replaced with very little down-time. If an expanded grading system were needed, the system provides for simplified reconfiguration and expansion.

Although the present invention has been described in detail with respect to certain embodiments and examples, variations and modifications exist which are within the scope of the present invention as defined in the following claims.

What is claimed is:

1. A modular weighing system which comprises:

feed conveyor means, a weighing conveyor for receiving an object from said feed conveyor means and for weighing said object, said weighing conveyor comprising a platform having upper and lower surfaces, and ends, each end having a roller rotatably mounted thereto, at least one of said rollers being outwardly movable from said platform responsive to an adjustable tensioning means, said adjustable tensioning means applying an outward pressure to said movable roller in a tensioned position, and releasing said movable roller in a released position, said platform and rollers being located inside a belt, said belt extending around said rollers and said platform, said adjustable tensioning means applying outward pressure to said movable roller and thereby applying tension to said belt in said tensioned position and said belt contacting said upper and lower surfaces of said platform, said adjustable tensioning means releasing said movable roller and said belt slackening around said rollers and platform in said released position, said platform further comprising a downwardly extending support bracket, motor means, driven by a supply of power, securely mounted to said platform for engaging a drive means securely mounted to an end of one of said rollers, said roller rotating responsively to rotational movements of said motor means, and said roller driving said belt;

said weighing conveyor downwardly extending support bracket being securely mounted to a load cell, the weight of said weighing conveyor being applied to said load cell, said load cell generating an electrical output corresponding to the sum of the weight of said weighing conveyor and the weight of said object;

said load cell being releasably secured to a frame by easily releasable clamp means having open and locked positions, said load cell and weighing conveyor being removable in said open position, said load cell and weighing conveyor being secured to said frame in said locked position,;

said supply of power being connected to said motor means by quick release connections, and said load cell electrical output being fastened to said load cell by a quick release connector;

wherein the weight to be measured by said load cell includes the weight of said weighing conveyor to eliminate errors due to belt slinging, and said weighing conveyor and load cell being easily removable and modular for reduced down-time and simplified maintenance of said weighing system.

2. A modular weighing system according to claim 1 wherein said feed conveyor means comprising a platform having upper and lower surfaces, and ends, each end having a roller rotatably mounted thereto, at least one of said rollers being outwardly movable from said platform responsive to an adjustable tensioning means, said adjustable tensioning means applying an outward pressure to said movable roller in a tensioned position, and releasing said movable roller in a released position, said platform and rollers being located inside a belt, said belt extending around said rollers and said platform, said adjustable tensioning means applying outward pressure to said movable roller and thereby applying tension to said belt in said tensioned position and said belt contacting said upper and lower surfaces of said platform, said adjustable tensioning means releasing said movable roller and said belt slackening around said rollers and platform in said released position, said platform further comprising a downwardly extending support bracket, motor means, driven by a supply of power, securely mounted to said platform for engaging a drive means securely mounted to an end of one of said rollers, said roller rotating responsively to rotational movements of said motor means, and said roller driving said belt;

said feed conveyor downwardly extending support bracket being releasably secured to said frame by easily releasable clamp means having open and locked positions, said feed conveyor being removable in said open position, said feed conveyor being secured to said frame in said locked position.

3. A modular weighing system according to claim 1 wherein said motor means being an air powered motor, said supply of power being a regulated supply of air, and said quick release connections to said motor means being quick release air connections.

4. A modular weighing system according to claim 3 further comprising tachometer means for generating a signal corresponding to the speed of said belt; and means for reading said speed signal and for regulating said supply of power for maintaining a predetermined conveyor belt speed to allow a predetermined settling time for said load cell to accurately measure said weighing conveyor and said object weight.

5. A modular weighing system according to claim 1 further comprising grader means for receiving objects from said weighing conveyor and for categorizing said objects into predetermined weight categories, said grader means comprising:

a grader frame, a grading conveyor belt supported by said grader frame and being movable by a conveyor driving means, said objects being carried on said conveyor belt past a plurality of grading stations, each of said weight categories having an associated grading station and an associated accumulation hopper along said conveyor, each grading station comprising a grading paddle for directing objects of said associated category into said accumulation hopper, and a grader control module for receiving a control signal and for actuating a paddle driver means responsive to said control signal, for rotating said grading paddle for directing objects in a category associated with said grading station into said hopper associated with said category, each control module further comprising power supply and control signal connectors, said connectors being quick release connectors, each of said grader control modules being releasably attached to said grader frame by hinge means to allow said grader control module to be hinged away from said frame, said hinge means being secured by easily releasable fastening means, said grader control modules including easily releasable securing means for securing said control modules to said frame for preventing a rotation of said control modules in an operational mode of said grader means;

whereby said grader control modules may be easily hinged away from said frame for maintenance, and said control modules may be easily removed and replaced by releasing said easily releasable fastening means and said easily releasable securing means.

6. A modular grading system for receiving objects from a weighing system and for categorizing said objects into predetermined weight categories, said grader means comprising:

a grader frame, a grading conveyor belt supported by said grader frame and being movable by a conveyor driving means, said objects being carried on said conveyor belt past a plurality of grading stations, each of said weight categories having an associated grading station and an associated accumulation hopper along said conveyor, each grading station comprising a grading paddle for directing objects of said associated category into said accumulation hopper, and a grader control module for receiving a control signal and for actuating a paddle driver means responsive to said control signal, for rotating said grading paddle for directing objects in a category associated with said grading station into said hopper associated with said category, each control module further comprising power supply and control signal connectors, said connectors being quick release connectors, each of said grader control modules being releasably attached to said grader frame by hinge means to allow said grader control module to be hinged away from said frame, said hinge means being secured by easily releasable fastening means, said grader control modules including easily releasable securing means for securing said control modules to said frame for preventing a rotation of said control modules in an operational mode of said grader means;

whereby said grader control modules may be easily hinged away from said frame for maintenance, and said control modules may be easily removed and replaced by releasing said easily releasable fastening means and said easily releasable securing means.

7. A modular grading system for receiving objects from a weighing system and for categorizing said objects into at least one predetermined weight category, said grader means comprising:

a drive module having a drive means for moving a grading conveyor belt;

a tensioning module for providing an adjustable tension for said grading conveyor belt; and at least one modular grading station comprising an accumulation hopper having an associated weight category, a grading paddle for directing objects of said associated category into said accumulation hopper, and a grader control module for receiving a control signal and for actuating a paddle driver means responsive to said control signal for rotating said grading paddle and for directing objects in a category associated with said grading station into said hopper associated with said category; said objects being carried on said conveyor belt past said at least one grading station, each of said at least one weight category having an associated grading station, said grading station each control module further comprising power supply and control signal connectors, said connectors being quick release connectors, said grader control modules being releasably attached to said modular grading station by hinge means to allow said grader control module to be hinged away from said station, said hinge means being secured by easily releasable fastening means, said grader control modules including easily releasable securing means for securing said control modules to said grading station for preventing a rotation of said control modules in an operational mode of said grader means;

whereby additional grading stations may be added to said modular grading system to provide additional weight categories, and said grader control modules may be easily hinged away from said stations for maintenance, and said control modules may be easily removed and replaced by releasing said easily releasable fastening means and said easily releasable securing means.

* * * * *